(12) United States Patent
Kauffmann et al.

(10) Patent No.: US 8,922,481 B1
(45) Date of Patent: Dec. 30, 2014

(54) CONTENT ANNOTATION

(75) Inventors: Alejandro Kauffmann, San Francisco, CA (US); Clifford L. Biffle, Berkeley, CA (US); Liang-Yu (Tom) Chi, San Francisco, CA (US); Luis Ricardo Prada Gomez, Hayward, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 13/422,371

(22) Filed: Mar. 16, 2012

(51) Int. Cl.
*G09G 5/00* (2006.01)

(52) U.S. Cl.
USPC .......................................................... 345/156

(58) Field of Classification Search
CPC ................................. G09G 5/00; G09G 5/003
USPC ............................................. 345/156, 8, 633
See application file for complete search history.

(56) References Cited

U.S. PATENT DOCUMENTS

| | | | |
|---|---|---|---|
| 6,585,521 B1 | 7/2003 | Obrador | |
| 7,003,139 B2 | 2/2006 | Endrikhovski et al. | |
| 7,050,078 B2 * | 5/2006 | Dempski ....................... | 715/700 |
| 7,418,116 B2 | 8/2008 | Fedorovskaya et al. | |
| 8,139,087 B2 * | 3/2012 | Kuroki et al. ................. | 345/633 |
| 2005/0280661 A1 * | 12/2005 | Kobayashi et al. ........... | 345/633 |
| 2008/0186255 A1 * | 8/2008 | Cohen et al. ...................... | 345/8 |
| 2008/0275830 A1 * | 11/2008 | Greig .............................. | 706/21 |
| 2009/0110246 A1 * | 4/2009 | Olsson et al. ................. | 382/118 |
| 2010/0011023 A1 * | 1/2010 | Nakaoka ..................... | 707/104.1 |
| 2010/0295769 A1 * | 11/2010 | Lundstrom .................... | 345/156 |
| 2011/0241976 A1 * | 10/2011 | Boger et al. ....................... | 345/8 |
| 2013/0147687 A1 * | 6/2013 | Small et al. ....................... | 345/8 |
| 2013/0147836 A1 * | 6/2013 | Small et al. .................... | 345/633 |

FOREIGN PATENT DOCUMENTS

WO  WO 2011008236  1/2011

OTHER PUBLICATIONS

Human Sensing for Human-Media Interaction, Facial Expression Recognition, Queen Mary University of London: Deparatment of Electrical Engineering: MMV Group, England, Aug. 29, 2011.
Takemura et al., Diminishing Head-Mounted Display for Shared Mixed Reality, Proceedings of International Symposium on Mixed and Augmented Reality (ISMAR'02), IEEE Computer Society, Washington, DC, USA, 2002.

* cited by examiner

*Primary Examiner* — Fred Tzeng
(74) *Attorney, Agent, or Firm* — McDonnell Boehnen Hulbert & Berghoff LLP

(57) ABSTRACT

Methods and systems for annotating objects and/or actions are provided. An example method includes receiving a selection of a content object via an interface of a wearable computing device. The wearable computing device may include a head-mounted display (HMD). The method may also include, but is not limited to, displaying the selected content object on the HMD. Additionally, the method may include obtaining facial-muscle information while the content object is being displayed on the HMD. A facial expression may also be determined based on the facial-muscle information. According to the method, the content object may be associated with an annotation comprising an indication of the facial expression.

24 Claims, 13 Drawing Sheets

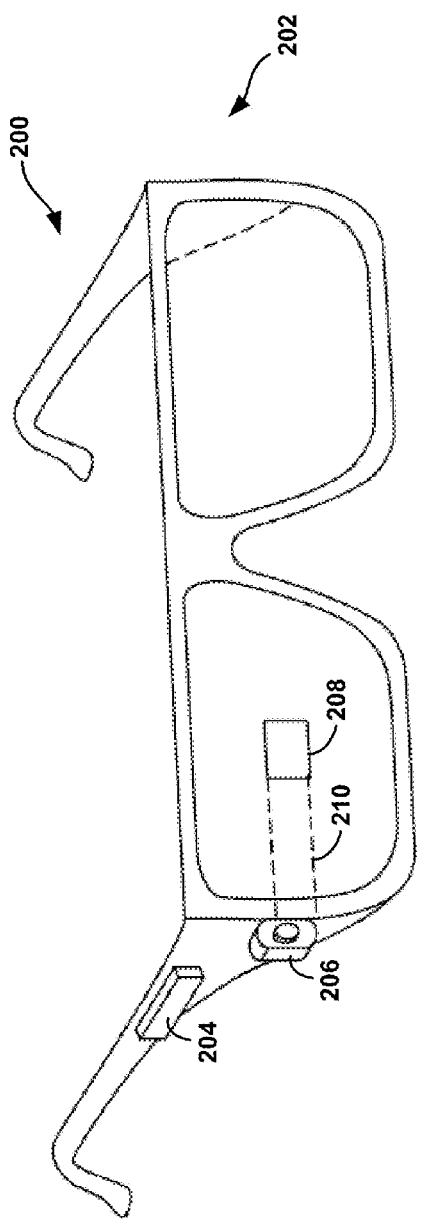
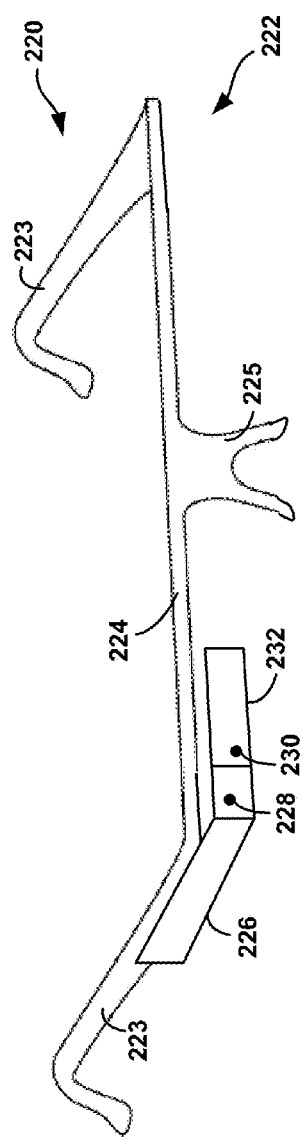
FIGURE 2A
FIGURE 2B

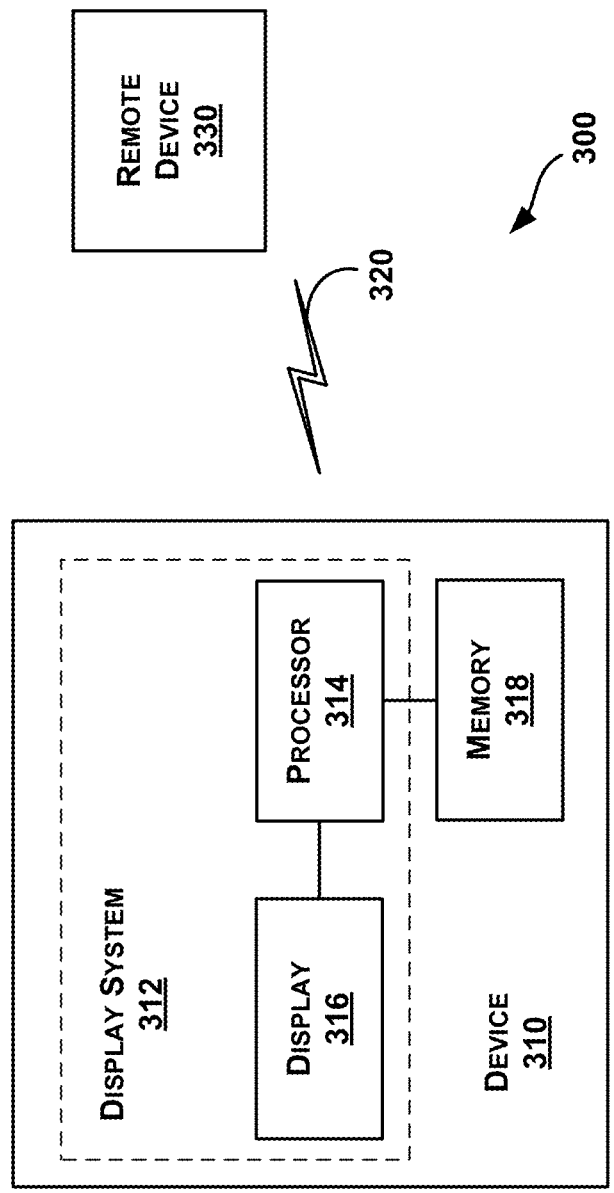

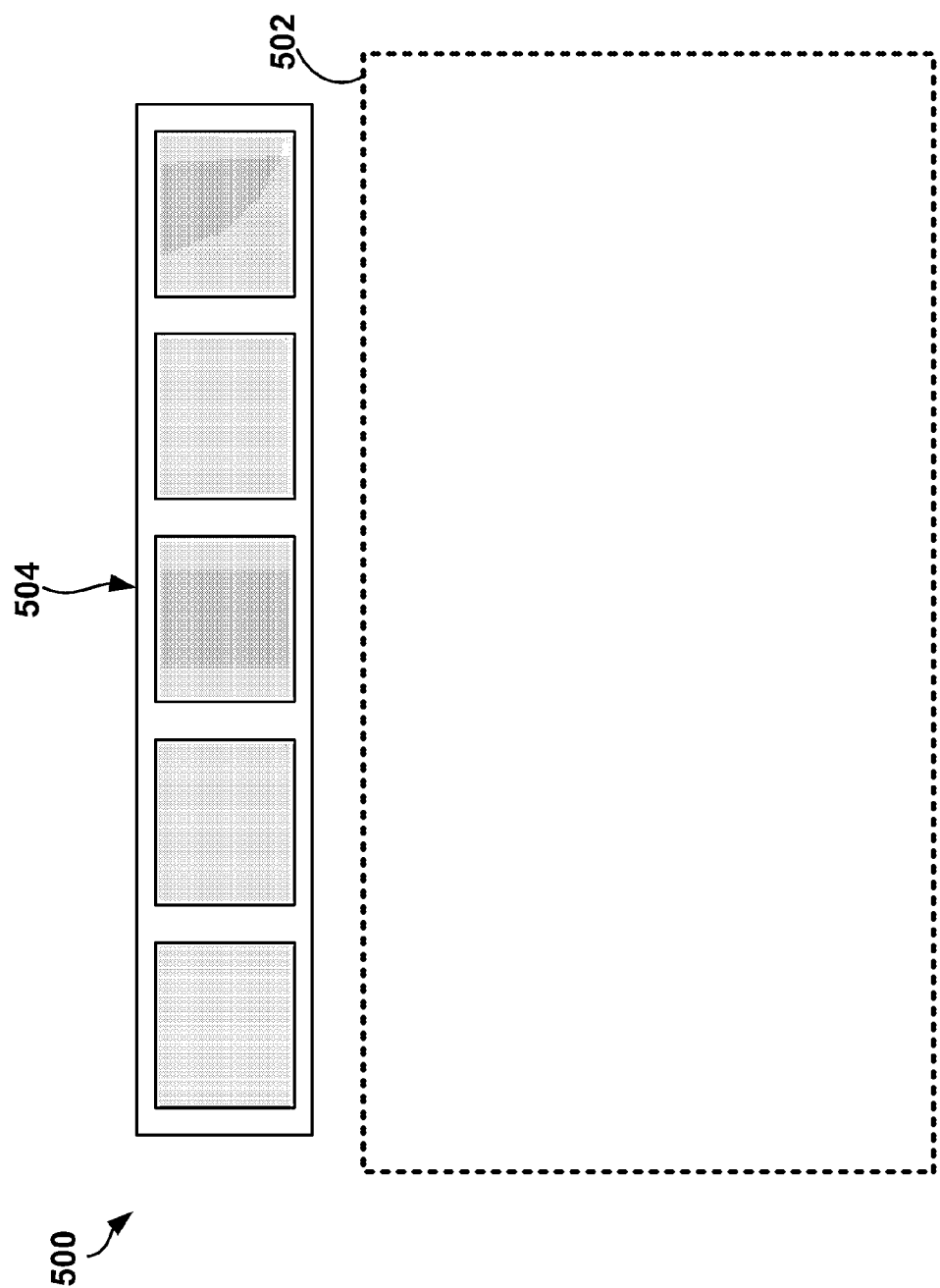

CONTENT ANNOTATION

BACKGROUND

Digital images are often annotated to support the use of browsing, searching, and retrieving features of an image retrieval system. For example, an image retrieval system may include a database of digital images having associated annotations. The annotations may include metadata such as captioning, keywords, or other descriptions associated with the digital images so that retrieval can be executed based on the annotations. In some examples, an image retrieval system may offer an automatic image annotation component.

Automatic image annotation or automatic image tagging offers the ability to automatically assign metadata to a digital image. In some instances, computer vision techniques are employed to organize or locate images of interest from a database. For example, a system may include training images having annotations associated with various feature vectors (classifications of colors, shapes, textures, patterns, etc. within an image). Machine learning may then be used to determine a correlation between the feature vectors and the associated annotations of the training images. Finally, annotations may be assigned to raw or un-annotated images based on feature vectors identified within the raw images and the correlations determined via machine learning.

SUMMARY

In one example aspect, a method is provided that comprises receiving a selection of a content object via an interface of a wearable computing device. The wearable computing device may include a head-mounted display (HMD). The method may also include, but is not limited to, displaying the selected content object on the HMD. Additionally, the method may include obtaining facial-muscle information while the content object is being displayed on the HMD. A facial expression may also be determined based on the facial-muscle information. According to the method, the content object may be associated with an annotation comprising an indication of the facial expression.

In another example aspect, a non-transitory computer-readable memory having stored thereon instructions executable by a computing device to cause the computing device perform functions is provided. The functions may comprise receiving a selection of a content object via an interface of a wearable computing device. The wearable computing device may include a head-mounted display (HMD). The functions may also include displaying the selected content object on the HMD and obtaining facial-muscle information while the content object is being displayed on the HMD. Additionally, the functions may include determining a facial expression based on the facial-muscle information. According to the functions, the content object may be associated with an annotation comprising an indication of the facial expression.

In another example aspect, a wearable computing device is provided. The wearable computing device may include an interface configured to receive information associated with a selection of a content object via the interface. The wearable computing device may further include a head-mounted display (HMD) configured to display the selected content object. The wearable computing device may further include a sensing component configured to obtain facial-muscle information while the content object is being displayed by the HMD. The wearable computing device may additionally include a processing component configured to determine a facial expression based on the facial-muscle information, and an annotation component configured to associate the content object with an annotation comprising an indication of the facial expression.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 2A illustrates another example system for receiving, transmitting, and displaying data.

FIG. 2B illustrates yet another example system for receiving, transmitting, and displaying data.

FIG. 3 shows a simplified block diagram of an example computer network infrastructure.

FIG. 5A shows aspects of an example user-interface.

DETAILED DESCRIPTION

Figure 1A:
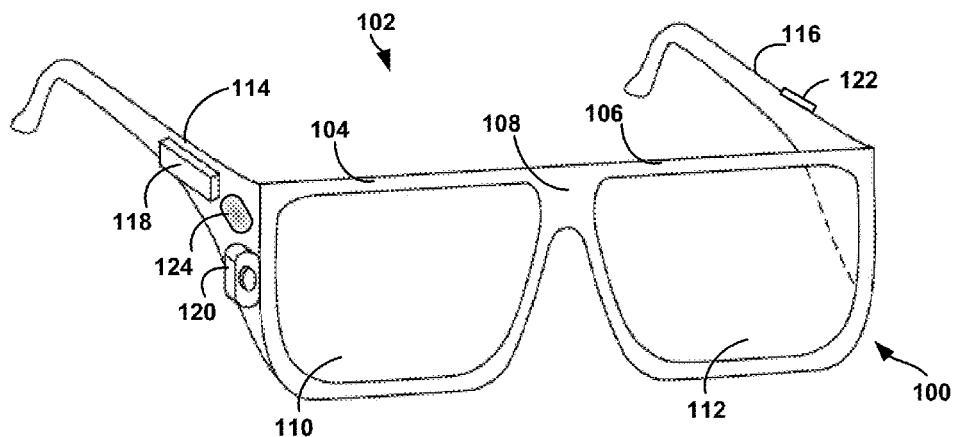
FIG. 1A illustrates an example system for receiving, transmitting, and displaying data.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Disclosed herein are methods and systems for annotating content objects displayed on a head-mounted display (HMD) based on information associated with one or more facial expressions. An example method includes receiving a selection of a content object via an interface of a wearable computing device. For example, the wearable computing device may include a HMD and be capable of receiving, transmitting, and/or displaying data. A user may select one or more content objects via a user-interface of the wearable computing device.

The content objects may take several forms. For example, the content objects may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects may take other forms as well.

Based on a selection of a content object, a display associated with the content object may be provided on the HMD, and facial-muscle information may be obtained while the content object is being displayed on the HMD. In one example, the facial-muscle information may include information associated with one or more movements or positions of muscles of a user's face while the user of the HMD is viewing the content object. In one instance, the HMD may obtain information of one or more regions of the user's face using one or more sensors, and the facial-muscle information may be received from the sensors while the user is viewing the display.

Based on the facial-muscle information, a facial expression may be received or determined, and the content object may be associated with an annotation comprising an indication of the facial expression. For example, a user may view an attachment to an email (e.g., an email including a photograph) via the HMD. While the user is viewing the attachment, information indicating the user is smiling may be obtained and determined, and the photograph may be associated with an indication of the smile.

In some examples, an indication of a facial expression may be a representation of the facial expression. For instance, if the determined facial expression is a frown, a content object may be associated with a textual representation or graphical representation of a frown. However, indications of facial expressions are not limited to representations of the facial expressions. In some instances, content objects may be associated with an indication of a facial expression that is implied by the facial expression. For example, if determined facial expressions indicate a user is laughing, smiling, or surprised, the indication may be information which indicates a content object is funny.

In some instances, content objects may be searchable based on annotations associated with the content objects. For example, a user may search a plurality of content objects based on a given facial expression (e.g., a smile, a frown, etc.), and content objects associated with the given facial expression may be identified and/or returned. In other examples, a user may search a plurality of content objects based on annotations implied by one or more facial expressions. In some examples, content objects viewed on the HMD may be automatically annotated based on facial expressions of a user in order to facilitate tagging, storage, and/or retrieval of the content objects.

2. Example System and Device Architecture

FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
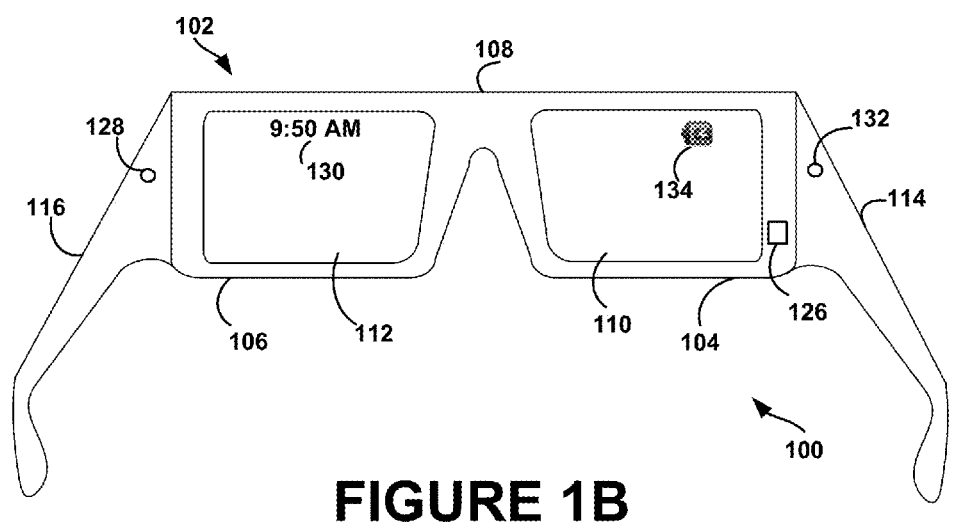
FIG. 1B illustrates an alternate view of the system illustrated in FIG. 1A.

FIG. 1B illustrates an alternate view of the system 100 illustrated in FIG. 1A. The head-mounted device 102 may include a sensing component 126. The sensing component 126 may be, for example, a camera configured to capture images and/or videos, in one or more portions of the electromagnetic spectrum (e.g., visible light, infrared, etc.). In another example, the sensing component 126 may be a motion sensing input device using, for example, an infrared projector and camera. Thus, the sensing component 126 may, in some examples captured three-dimensional (3D) data.

The sensing component 126 may also include various lenses, optics, or other components to alter the focus and/or direction of the sensing component 126. In some instances, the head-mounted device 102 may include multiple, similar or different, sensing components (not shown). As another example, the sensing component may include an electromyography (EMG) sensor. For instance, the EMG sensor may be a surface electrode used to monitor the general picture of muscle activation based on detected electrical potentials. Although the sensing component 126 is shown coupled to an inside surface of the frame element 104, one or more sensing components may be coupled to the frame elements 104, 106, and 108 and/or the extending side-arms 114, 116 in place of and/or in addition to the sensing component 126 as well.

As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto the lens elements 110, 112 from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

FIG. 2A illustrates another example system 200 for receiving, transmitting, and displaying data. The system 200 is shown in the form of a wearable computing device 202. The wearable computing device 202 may include frame elements and side-arms such as those described with respect to FIGS. 1A and 1B. The wearable computing device 202 may additionally include an on-board computing system 204 and a video camera 206, such as those described with respect to FIGS. 1A and 1B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A and 1B, and may be configured to overlay computer-generated graphics in the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

FIG. 2B illustrates yet another example system 220 for receiving, transmitting, and displaying data. The system 220 is shown in the form of a wearable computing device 222. The wearable computing device 222 may include side-arms 223, a center frame support 224, and a bridge portion with nose-piece 225. In the example shown in FIG. 2B, the center frame support 224 connects the side-arms 223. The wearable computing device 222 does not include lens-frames containing lens elements. The wearable computing device 222 may additionally include an on-board computing system 226 and a video camera 228, and a sensing component 230, such as those described with respect to FIGS. 1A and 1B.

The wearable computing device 222 may include a single lens element 232 that may be coupled to one of the side-arms 223 or the center frame support 224. The lens element 232 may include a display such as the display described with reference to FIGS. 1A and 1B, and may be configured to overlay computer-generated graphics upon the user's view of the physical world. In one example, the single lens element 232 may be coupled to a side of the extending side-arm 223. The single lens element 232 may be positioned in front of or proximate to a user's eye when the wearable computing device 222 is worn by a user. For example, the single lens element 232 may be positioned below the center frame support 224, as shown in FIG. 2B.

FIG. 3 shows a simplified block diagram of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the head-mounted device 102, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device, such as a laptop computer, a mobile telephone, or tablet computing device, etc., that is configured to transmit data to or receive data from the device 310. The remote device 330 and the device 310 may contain hardware to enable the communication link 320, such as processors, transmitters, receivers, antennas, etc.

In FIG. 3, the communication link 320 is illustrated as a wireless connection. The wireless connection may use, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used. For example, the communication link 320 may be a wired link via a serial bus such as a universal serial bus or a parallel bus. Either of such a wired and/or wireless connection may be a proprietary connection as well. The remote device 330 may be accessible, using wired or wireless links, via the Internet and may include a computing cluster associated with a particular web service (e.g., social-networking, photo sharing, address book, etc.).

Figure 4:
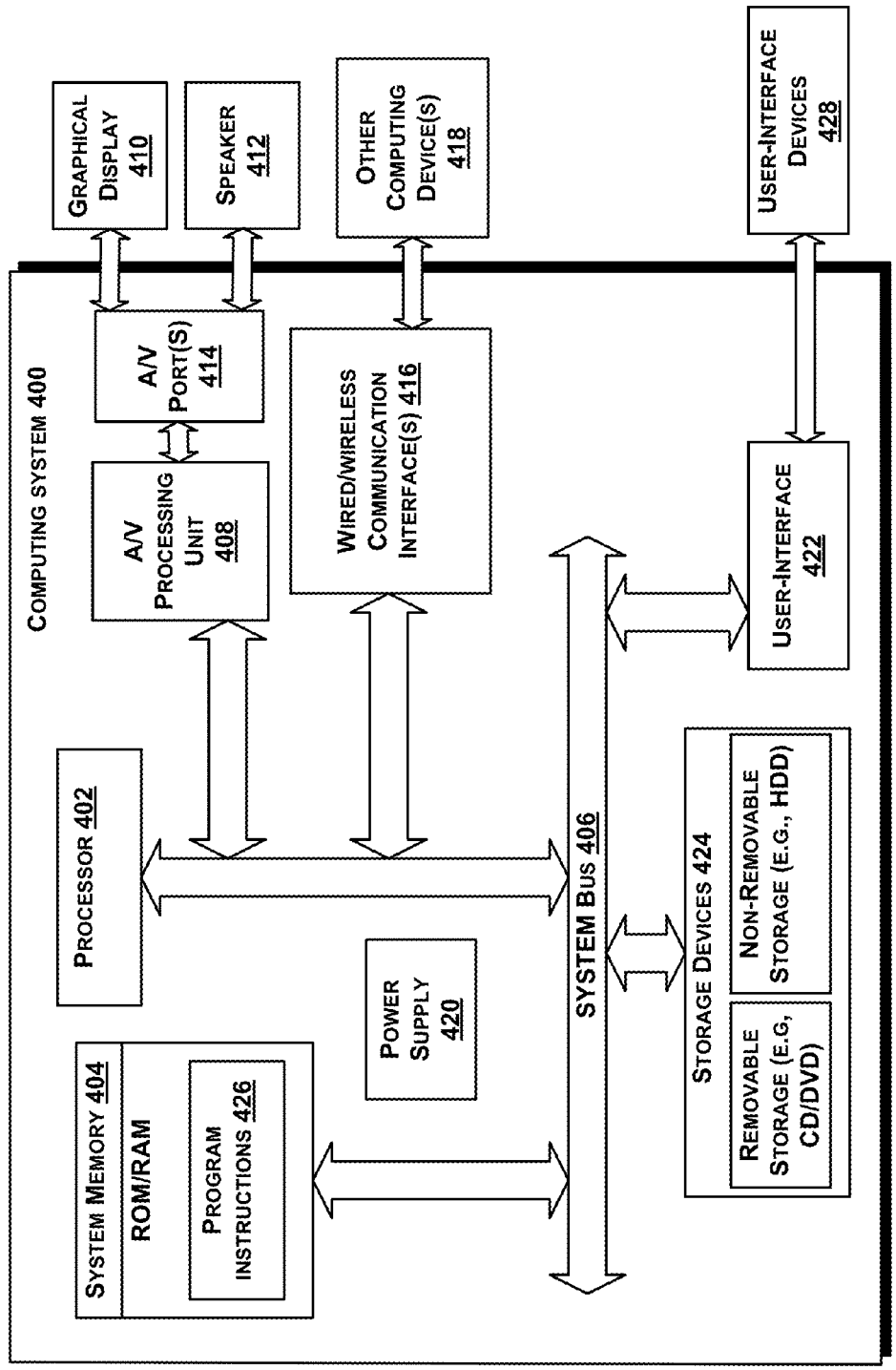
FIG. 4 shows a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (µP), a microcontroller (µ), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, such as the example user-interface described below in connection with FIGS. 5A-D, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

Figure 6:
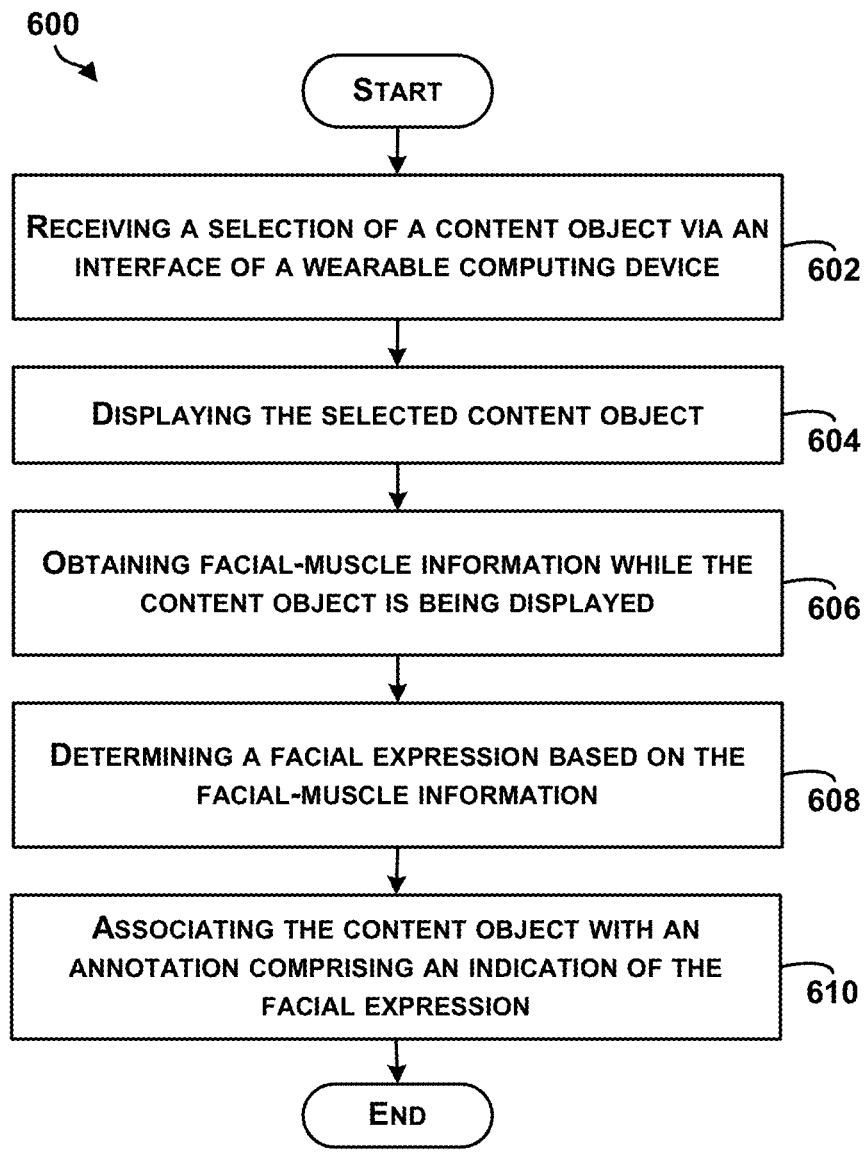
FIG. 6 is a block diagram of an example method of annotating a content object.

According to an example embodiment, computing system 400 may include program instructions 426 that are stored in system memory 404 (and/or possibly in another data-storage medium) and executable by processor 402 to facilitate the various functions described herein including, but not limited to, those functions described with respect to FIG. 6. Although various components of computing system 400 are shown as distributed components, it should be understood that any of such components may be physically integrated and/or distributed according to the desired configuration of the computing system.

3. Example User-Interface

FIGS. 5A-D show aspects of an example user-interface 500. The user-interface 500 may be displayed by, for example, a wearable computing device as described above for FIGS. 1A-2B.

An example state of the user-interface 500 is shown in FIG. 5A. The example state shown in FIG. 5A may correspond to a first position of the wearable computing device. That is, the user-interface 500 may be displayed as shown in FIG. 5A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 500 includes a view region 502. An example boundary of the view region 502 is shown by a dotted frame. While the view region 502 is shown to have a landscape shape (in which the view region 502 is wider than it is tall), in other embodiments the view region 502 may have a portrait or square shape, or may have a non-rectangular shape, such as a circular or elliptical shape. The view region 502 may have other shapes as well.

The view region 502 may be, for example, the viewable area between (or encompassing) the upper, lower, left, and right boundaries of a display on the wearable computing device. As shown, when the wearable computing device is in the first position, the view region 502 is substantially empty (e.g., completely empty) of user-interface elements, such that the user's view of their real-world environment is generally uncluttered, and objects in the user's environment are not obscured.

In some embodiments, the view region 502 may correspond to a field of view of a wearer of the wearable computing device, and an area outside the view region 502 may correspond to an area outside the field of view of the wearer. In other embodiments, the view region 502 may correspond to a non-peripheral portion of a field of view of a wearer of the wearable computing device, and an area outside the view region 502 may correspond to a peripheral portion of the field of view of the wearer. In still other embodiments, the user-interface 500 may be larger than or substantially the same as a field of view of a wearer of the wearable computing device, and the field of view of the wearer may be larger than or substantially the same size as the view region 502. The view region 502 may take other forms as well.

Accordingly, the portions of the user-interface 500 outside of the view region 502 may be outside of or in a peripheral portion of a field of view of a wearer of the wearable computing device. For example, as shown, a menu 504 may be outside of or in a peripheral portion of the field of view of the user in the user-interface 500. While the menu 504 is shown to be not visible in the view region 502, in some embodiments the menu 504 may be partially visible in the view region 502.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 502 and the menu 504 to move such that the menu 504 becomes more visible in the view region 502. For example, the wearable computing device may cause the view region 502 to move upward and may cause the menu 504 to move downward. The view region 502 and the menu 504 may move the same amount, or may move different amounts. In one embodiment, the menu 504 may move further than the view region 502. As another example, the wearable computing device may cause only the menu 504 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 122 described above in connection with FIG. 1A. In some embodiments, the movement data may comprise a binary indication corresponding to the upward movement. In other embodiments, the movement data may comprise an indication corresponding to the upward movement as well as an extent of the upward movement. The movement data may take other forms as well.

Figure 5B:
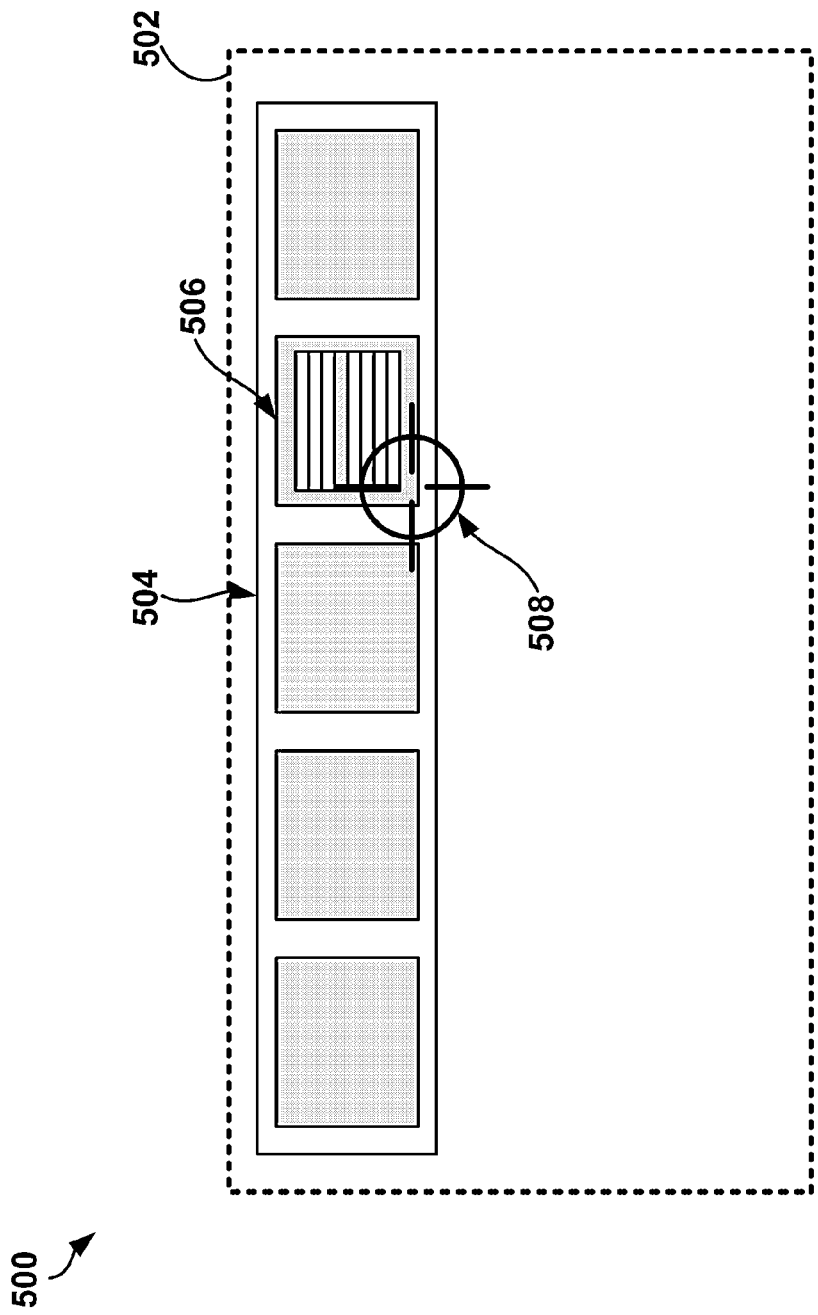
FIG. 5B shows aspects of an example user-interface after receiving movement data corresponding to an upward movement.

FIG. 5B shows aspects of an example user-interface after receiving movement data corresponding to an upward movement. As shown, the user-interface 500 includes the view region 502 and the menu 504.

As noted above, in response to receiving the movement data corresponding to an upward movement of the wearable computing device, the wearable computing device may move one or both of the view region 502 and the menu 504 such that the menu 504 becomes more visible in the view region 502.

As shown, the menu 504 is fully visible in the view region 502. In other embodiments, however, only a portion of the menu 504 may be visible in the view region 502. In some embodiments, the extent to which the menu 504 is visible in the view region 502 may be based at least in part on an extent of the upward movement.

Thus, the view region 502 may be moved in response to receiving data corresponding to an upward movement. In some embodiments, the view region 502 may be moved in an upward scrolling or panning motion. For instance, the view region 502 may appear to a wearer of the wearable computing device as if mapped onto the inside of a static sphere centered at the wearable computing device, and movement of the view region 502 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 502 may be moved by, for example, jumping between fields of view. In still other embodiments, the view region 502 may be moved only when the upward movement exceeds a threshold speed, acceleration, and/or magnitude. In response to receiving data corresponding to an upward movement that exceeds such a threshold or thresholds, the view region 502 may pan, scroll, slide, or jump to a new field of view. The view region 502 may be moved in other manners as well.

While the foregoing description focused on upward movement, it is to be understood that the wearable computing device could be configured to receive data corresponding to other directional movement (e.g., downward, leftward, rightward, etc.) as well, and that the view region 502 may be moved in response to receiving such data in a manner similar to that described above in connection with upward movement.

As shown, the menu 504 includes a number of content objects 506. In some embodiments, the content objects 506 may be arranged in a ring (or partial ring) around and above the head of a wearer of the wearable computing device. In other embodiments, the content objects 506 may be arranged in a dome-shape above the wearer's head. The ring or dome may be centered above the wearable computing device and/or the wearer's head. In other embodiments, the content objects 506 may be arranged in other ways as well.

The number of content objects 506 in the menu 504 may be fixed or may be variable. In embodiments where the number is variable, the content objects 506 may vary in size according to the number of content objects 506 in the menu 504. In embodiments where the content objects 506 extend circularly around a wearer's head, like a ring (or partial ring), only some of the content objects 506 may be visible at a particular moment. In order to view other content objects 504, a wearer of the wearable computing device may interact with the wearable computing device to, for example, rotate the content objects 506 along a path (e.g., clockwise or counterclockwise) around the wearer's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

Depending on the application of the wearable computing device, the content objects 506 may take several forms. For example, the content objects 506 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 506 may take other forms as well.

In embodiments where the content objects 506 include tools, the tools may be located in a particular region of the menu 504, such as the center. In some embodiments, the tools may remain in the center of the menu 504, even if the other content objects 506 rotate, as described above. Tool content objects may be located in other regions of the menu 504 as well.

The particular content objects 506 that are included in menu 504 may be fixed or variable. For example, the content objects 506 may be preselected by a wearer of the wearable computing device. In another embodiment, the content objects 506 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 506 may fixed, while the content objects 506 may be variable. The content objects 506 may be selected in other manners as well.

Similarly, an order or configuration in which the content objects 506 are displayed may be fixed or variable. In one embodiment, the content objects 506 may be pre-ordered by a wearer of the wearable computing device. In another embodiment, the content objects 506 may be automatically ordered based on, for example, how often each content object 506 is used (on the wearable computing device only or in other contexts as well), how recently each content object 506 was used (on the wearable computing device only or in other contexts as well), an explicit or implicit importance or priority ranking of the content objects 506, and/or other criteria.

In some embodiments, the wearable computing device may be further configured to receive from the wearer a selection of a content object 506 from the menu 504. To this end, the user-interface 500 may include a cursor 508, shown in FIG. 5B as a reticle, which may be used to navigate to and select content objects 506 from the menu 504. In some embodiments, the cursor 508 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, such as the sensor 122 of FIG. 1A, or may be included in a peripheral device communicatively coupled to the wearable computing device. As another example, the selection data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 508 to the content object 506 using one or more predetermined movements. In order to select the content object 506, the wearer may perform an additional predetermined movement, such as holding the cursor 508 over the content object 506 for a predetermined period of time. The wearer may select the content object 506 in other manners as well.

Figure 5C:
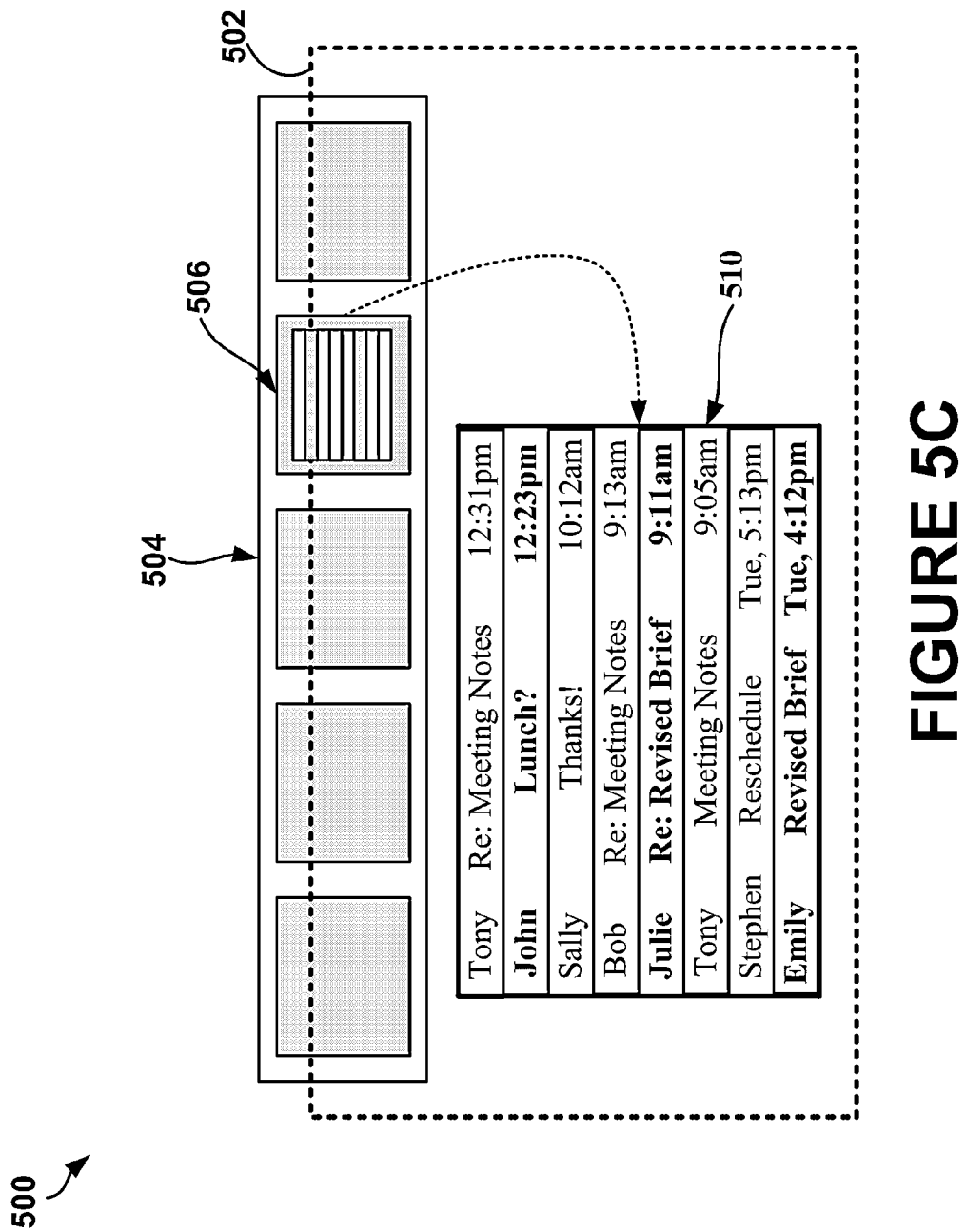
FIG. 5C shows aspects of an example user-interface after selection of a selected content object.

Once a content object 506 is selected, the wearable computing device may cause the content object 506 to be displayed in the view region 502 as a selected content object. FIG. 5C shows aspects of an example user-interface after selection of a selected content object, in accordance with an embodiment.

As indicated by the dotted arrow, the content object 506 is displayed in the view region 502 as a selected content object 510. As shown, the selected content object 510 is displayed larger and in more detail in the view region 502 than in the menu 504. In other embodiments, however, the selected content object 510 could be displayed in the view region 502 smaller than or the same size as, and in less detail than or the same detail as, the menu 504. In some embodiments, additional content (e.g., actions to be applied to, with, or based on the selected content object 510, information related to the selected content object 510, and/or modifiable options, preferences, or parameters for the selected content object 510, etc.) may be showed adjacent to or nearby the selected content object 510 in the view region 502.

Once the selected content object 510 is displayed in the view region 502, a wearer of the wearable computing device may interact with the selected content object 510. For example, as the selected content object 510 is shown as an email inbox, the wearer may wish to read one of the emails in the email inbox. Depending on the selected content object, the wearer may interact with the selected content object in other ways as well (e.g., the wearer may locate additional information related to the selected content object 510, modify, augment, and/or delete the selected content object 510, etc.). To this end, the wearable computing device may be further configured to receive input data corresponding to one or more predetermined movements indicating interactions with the user-interface 500. The input data may take any of the forms described above in connection with the selection data.

Figure 5D:
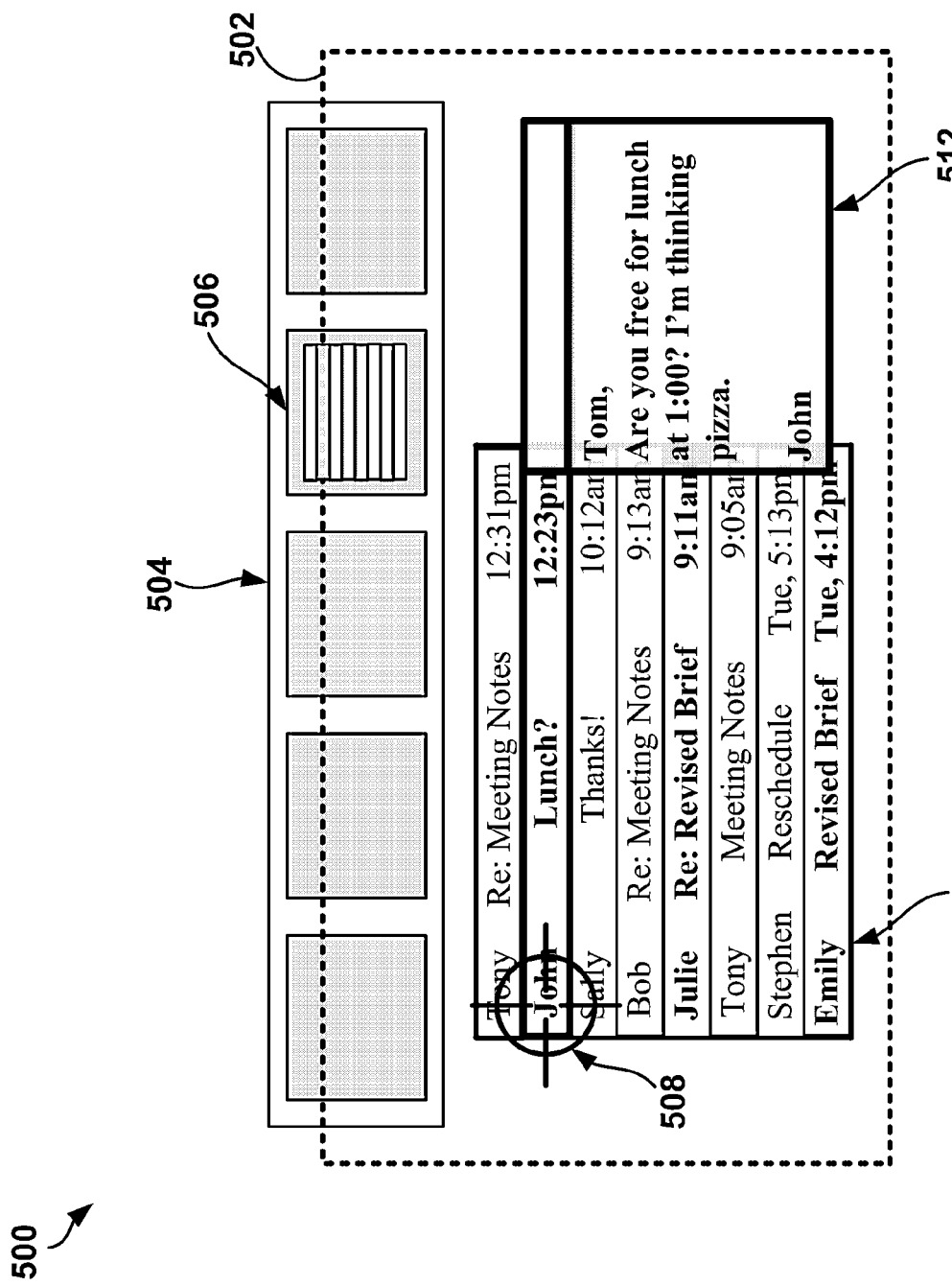
FIG. 5D shows aspects of an example user-interface after receiving input data corresponding to user input.

FIG. 5D shows aspects of an example user-interface after receiving input data corresponding to user input, in accordance with an embodiment. As shown, a wearer of the wearable computing device has navigated the cursor 508 to a particular subject line in the email inbox and selected the subject line. As a result, the email 512 is displayed in the view region, so that the wearer may read the email 512. The wearer may interact with the user-interface 500 in other manners as well, depending on, for example, the selected content object.

In some examples, information associated with one or more positions of a user's face while a user is viewing a selected content object may be used to facilitate annotating (or tagging) of the content object by the wearable computing device. FIG. 6 is a block diagram of an example method 600 of annotating a content object. Method 600 shown in FIG. 6 represents an embodiment that could be used with any of the systems of FIGS. 1-4, for example, and may be performed by a device, such as any devices illustrated in FIGS. 1-4, or components of the devices. Method 600 may include one or more operations, functions, or actions as illustrated by one or more of blocks 602-610. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

Initially, at block 602, the method 600 includes receiving a selection of a content object via an interface of a wearable computing device. In one instance, the wearable computing device may include a head-mounted display (HMD). A user may select a content object using a user-interface of the wearable computing device, and the wearable computing device may receive information associated with the selection. For example, the information associated with the selection may identify one or more content objects.

As an example, a user may select a document such as an email or other form of message as a content object. In a further example, the content object may be an attachment to an email (e.g., a photograph, video, calendar invitation, etc.). In other examples, the content object may include a webpage or portion of a webpage. In yet another example, the content object may be a communication with another user (e.g., an online chat, a text/video message, voice/video conversation, etc.).

At block 604, the method 600 includes displaying the selected content object. The display may be provided on the HMD such that a user of the HMD may view information associated with the content object. The display may include one or any combination of textual, visual, and audio data presented to the user. In one example, the display may be an augmented reality or heads-up display such that images or other information are superimposed over a real-world view as perceived by the user.

In other examples, the user may interact with the content object via the provided display. In one instance, a user may select an email from a list of emails. In other instance, a user may update a status (e.g., a status published to an online community or blog). In yet another instance, a user may record any combination of audio or video using the HMD.

At block 606, the method 600 includes obtaining facial-muscle information while the content object is being displayed. In one instance, the facial-muscle information may include information associated with one or more movements or positions of muscles of user's face while the user is viewing the display. In one example, the HMD may image one or more facial regions using one or more sensors, and the facial-muscle information may be received from the one or more sensors. For example, information associated with muscles affecting movement and positions of any combination of a user's eyes, eyebrows, forehead, nose, mouth, cheeks, and chin, among other possible regions of a user's face, may be received. In one instance, the HMD may receive information associated with one region of a user's face including a user's forehead, eyes, nose, and mouth. In other instance, the HMD may receive information associated with multiple regions individually.

In one example, the HMD may make use of facial recognition algorithms and techniques to identify a user's face and characterize the user's eyes, nose, mouth, etc., by extracting features from an image of the user's face. Upon identifying regions of a user's face, the information associated with the identified regions may be mapped to a model of a face, and information associated with the movements or positions of the muscles of the user's face may be determined based on the mapping.

In one instance, optical flow techniques may be used to identify movement of muscles or positions of the user's face that produce various facial appearances. For instance, positions of a user's left mouth corner and right mouth corner may be tracked. In another example, information associated with a contraction of the Zygomatic major muscle (a muscle that raises a corner of a user's mouth when a user smiles) while a user is viewing the provided display may be identified. In a further example, information associated with contraction of the orbicularis oculi muscles (which raise a user's cheeks and form wrinkles around a user's eyes) may be received. In some examples, relaxation or contraction of individual muscles of the user's face may be analyzed to determine an intensity of the relaxation or contraction as well as duration of the relaxation or contraction.

In other instances, static image texture analysis, feature point-based extraction classifiers, or dynamic analysis of video sequences may be used to identify movements or positions of muscles of a user's face.

In yet other instances, facial information may be recovered from sensing heat produced by activation of the facial muscles or cooling effects caused by perspiration. For example, high resolution far infrared cameras may be used for sensing the far infrared signatures of regions of the face. Alternatively, point thermosensors, constructed using standard pyroelectric materials or other means, might be used to sense the changing temperature at one specific region.

Alternatively, information about the user's mental state may be determined be sensing temperature changes at specific points on the face, as will be appreciated by one of ordinary skill in the art. For example, an increase in temperature at the Corrugator muscle in the middle of the forehead may indicate that the user is mentally engaged (i.e., the wrinkling of the brow). An increase in temperature at the maxillary area may reflect stress, and activation of muscles in the periorbital region may indicate startlement.

In still another instance, facial-muscle information may be obtained using electromyography or similar methods to detect electrical potential generated by muscles when muscle cells are electrically or neurologically activated.

At block 608, the method 600 includes determining a facial expression based on the facial-muscle information. Various algorithms may be used to compare the facial-muscle information to example facial-muscle information associated with a set of facial expressions. In some examples, the Facial Action Coding System (FACS) may be used to taxonomize a user's facial expressions as well known to one of ordinary skill in the art. For example, computer methods may be used to determine action units that are inputs to the FACS based on the information associated with movements or positions of the user's face. Based on the determined action units, computer methods may also be used to identify a facial expression associated with the action units according to the FACS.

At block 610, the method 600 includes associating the content object with an annotation comprising an indication of the facial expression. For example, metadata associated with the content object may be added to the content object or updated to provide an indication of one or more facial expressions. In some instances, the annotation may indicate joy, surprise, fear, anger, disgust, or sadness. In other instances, the annotation may indicate a smile, frown, or yawn. In some examples, metadata associated with the content object may indicate an annotation implied by one or more facial expressions. For instance, one or more determined facial expressions may be used to determine an emotional state (e.g., laughter, embarrassment, happiness, sadness), and the emotional state may be represented by metadata associated with the content object. A lookup table may be used to determine emotional states corresponding to facial expressions for example.

In some examples, the annotation may also indicate a date or time when the user viewed the content object and/or indicate an identity of the user. A computing component associated with the HMD may receive the information associated with the facial expression, determine a content object that was displayed while the facial expression was determined, and annotate the content object.

In one example, a user may have an option to ignore or discard an annotation. For example, upon annotating a content object, a notification that the content object has been annotated may be provided. In one instance, the notification may be a visual notification provided on the HMD. The visual notification may include a facial expression tagged to the content object. A user may be able to remove the annotation by selecting an undo option via the interface. An audio and/or textual notification may be provided as well. The undo option may be provided on the display for a limited amount of time after the notification (e.g., 10 seconds) in some instances.

In the examples in which the user interacts with a content object, the interaction may also be annotated with an indication of one or more facial expressions expressed by the user during the interaction. For example, in the instance in which a user updates a status by interacting with the content object, the event (i.e., the interaction with the content object) may be annotated with an indication of a facial expression of the user during the event. In some instances, the annotation may be published along with the status update.

In one instance, a user may search a plurality of annotated content objects using a facial expression as input to the search. For example, the plurality of content objects may be associated with a plurality of annotation including one or more indications of facial expressions. A user may request to search the plurality of content objects for content objects associated with a given facial expression (e.g., "Show me content objects that made me smile"). Additionally, the search may further be refined or limited to types or classes of content objects in some examples (e.g., "Show me pictures that made smile"). In some examples, the search may also include a search of annotated interactions with content objects or events. Based on the search, one or more content objects or events having annotations matching the given facial expression and adhering to any search constraints may be identified.

Similarly, a user may search for content objects based on an emotional state implied by one or more facial expressions. For instance, a user may search for a "funny" content object or type of content object (e.g., "funny" emails). In one example, metadata associated with the plurality of content objects may indicate implied emotional states, and the plurality of content objects may be searched for content objects having metadata matching a given emotional state. In an instance in which metadata associated with the plurality of content objects does not indicate emotional states, the plurality of content objects may be searched for content objects having metadata indicating one or more given facial expressions which imply a given emotional state.

In a further instance, a user may input a request to search the plurality of content objects using a voice input. For example, a microphone associated with the HMD may receive a voice search for content objects associated with a facial expression. However, other search input methods are also contemplated.

Figure 7:
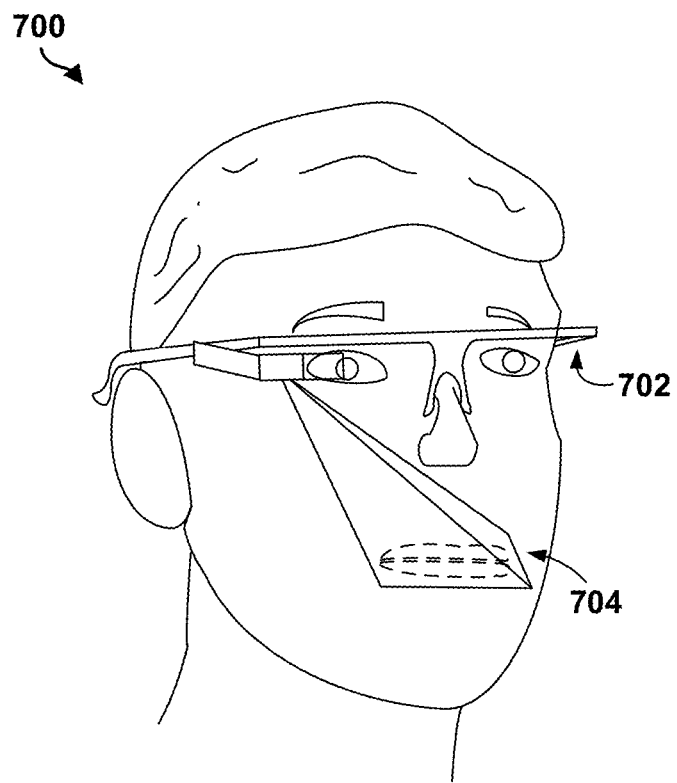
FIG. 7 is an example illustration of a head-mounted display imaging a region of a user's face.

FIG. 7 is an example illustration 700 of a head-mounted display (HMD) 702 imaging a region 704 of a user's face. As shown in FIG. 7, an imaging component of the HMD may be used to image one or more regions of a user's face, such as the region 704 near a user's mouth. Information associated with movements or positions of muscles of the user's face within the region 704 or other characteristics of the region 704 may be determined by imaging the region 704 while the user is wearing the HMD 702.

In some instances, a video of the region 704 may be recorded. In other instances, images or other types of information may be captured at predetermined intervals (e.g., every half second). Information associated with the region 704 may be transferred to a computing component associated with the HMD 702 such as a computing component coupled to the HMD 702 or a separate computing component connected wirelessly or via a wired connection to the HMD 702.

Although FIG. 7 illustrates the HMD 702 imaging one region near the user's mouth (i.e., the region 704), in other instances, the HMD 702 may image a larger or smaller region of any portion of the user's face and/or multiple regions of the user's face. Additionally, the region 704 may be of any shape.

Figure 8B:
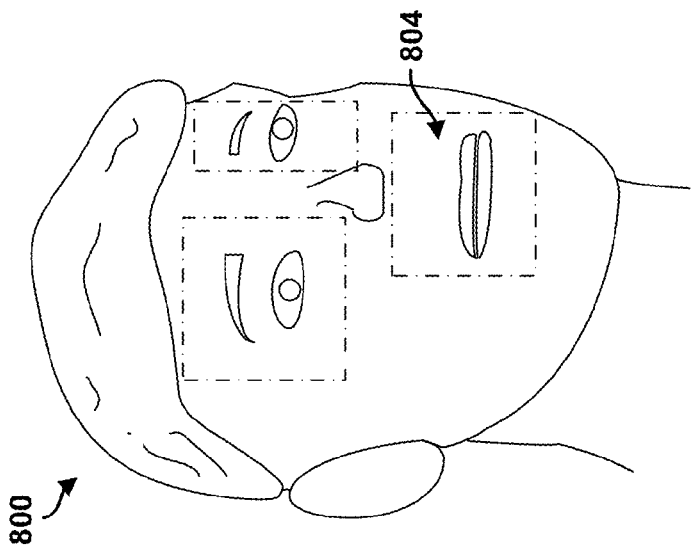
FIG. 8B identifies other example regions of a face of a user from which information may be received.
Figure 8A:
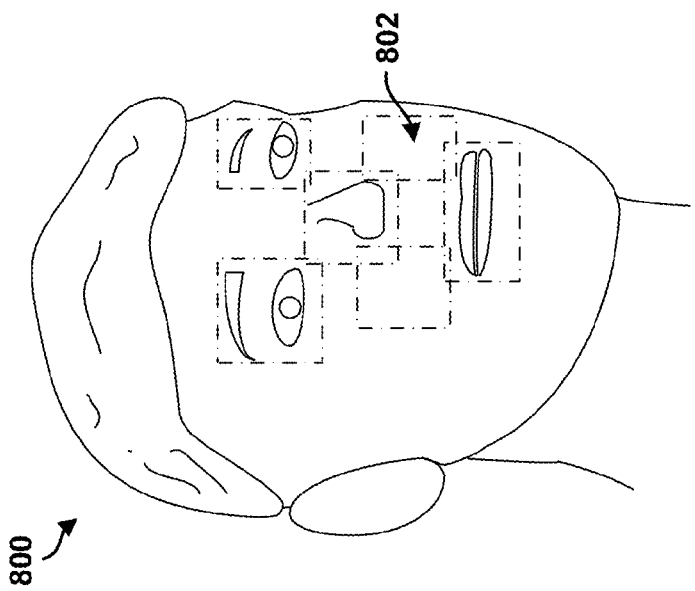
FIG. 8A identifies example regions of a face of a user from which information may be received.

FIG. 8A identifies example regions 802 of a face of a user 800 from which information may be received. As shown in FIG. 8A, six regions 802 of the face of the user 800 are identified by dotted lines. Any combination of imaging components of a HMD may be used to determine information associated with any of the six regions 802 while the user 800 is wearing the HMD.

FIG. 8B identifies other example regions 804 of a face of a user 800 from which information may be received. As shown in FIG. 8B, three regions 804 of the face of the user 800 are identified. Any combination of imaging components of a HMD may be used to determine information associated with the three regions 804 while the user 800 is wearing the HMD.

Figure 9B:
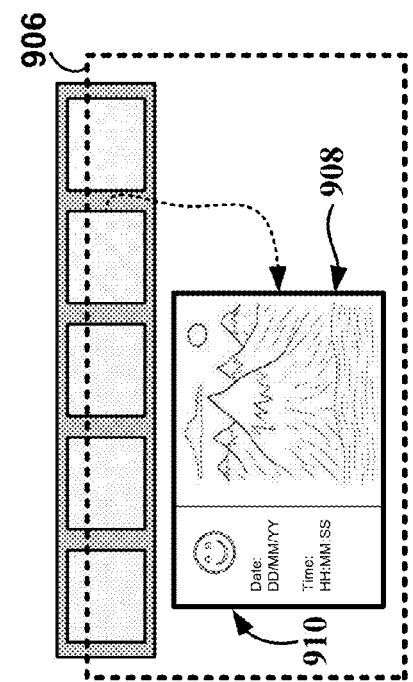
FIGS. 9A-9B show a conceptual illustration of associating an annotation with a content object based on a facial expression.
Figure 9A:
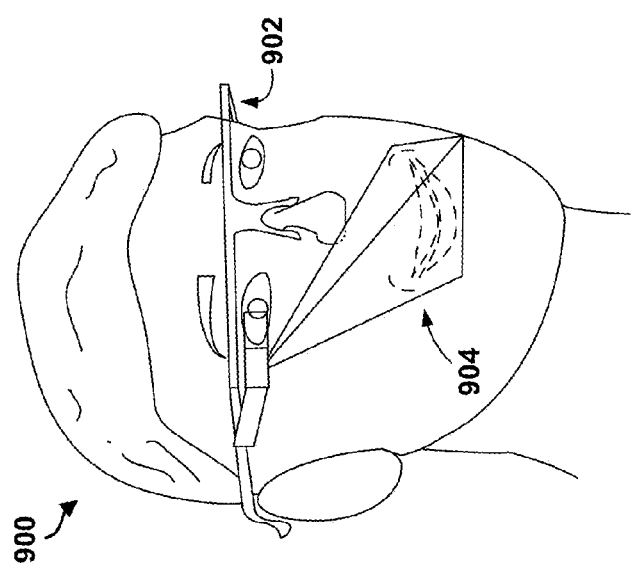

FIGS. 9A-9B show a conceptual illustration of associating an annotation with a content object based on a facial expression. As shown in FIG. 9A, facial-muscle information may be obtained from a user 900 of a head-mounted display (HMD) 902. In one example, the HMD may image a region 904 of a face of the user 900 while the user 900 is wearing the HMD 902. In some examples, a facial expression may be determined based on the facial-muscle information sensed from the region 904. For instance, the user 900 may be smiling while viewing a display of the HMD 902.

FIG. 9B shows an example user-interface of the HMD 902. The example user-interface may include a view region 906 as indicated by the dotted frame. In one instance, the view region 906 may be displayed on the HMD 902 after the facial expression has been determined. For example, the user 900 may have been viewing the content object 908 while the facial-muscle information was obtained (as shown in FIG. 9A). In response to the determined facial expression, an annotation may be associated with the content object. In some instances, a date/time stamp indicating when the facial expression was determined as well as an indication of the facial expression may be displayed within the viewing region 906. For example, an image 910, such as an emoticon, representing the facial expression which was determined while the user 900 was viewing the content object 908 may be displayed. In other examples, metadata including an indication of the facial expression may be stored with the content object 908 (or information identifying the content object 908) in a memory of the HMD 902.

Figure 10:
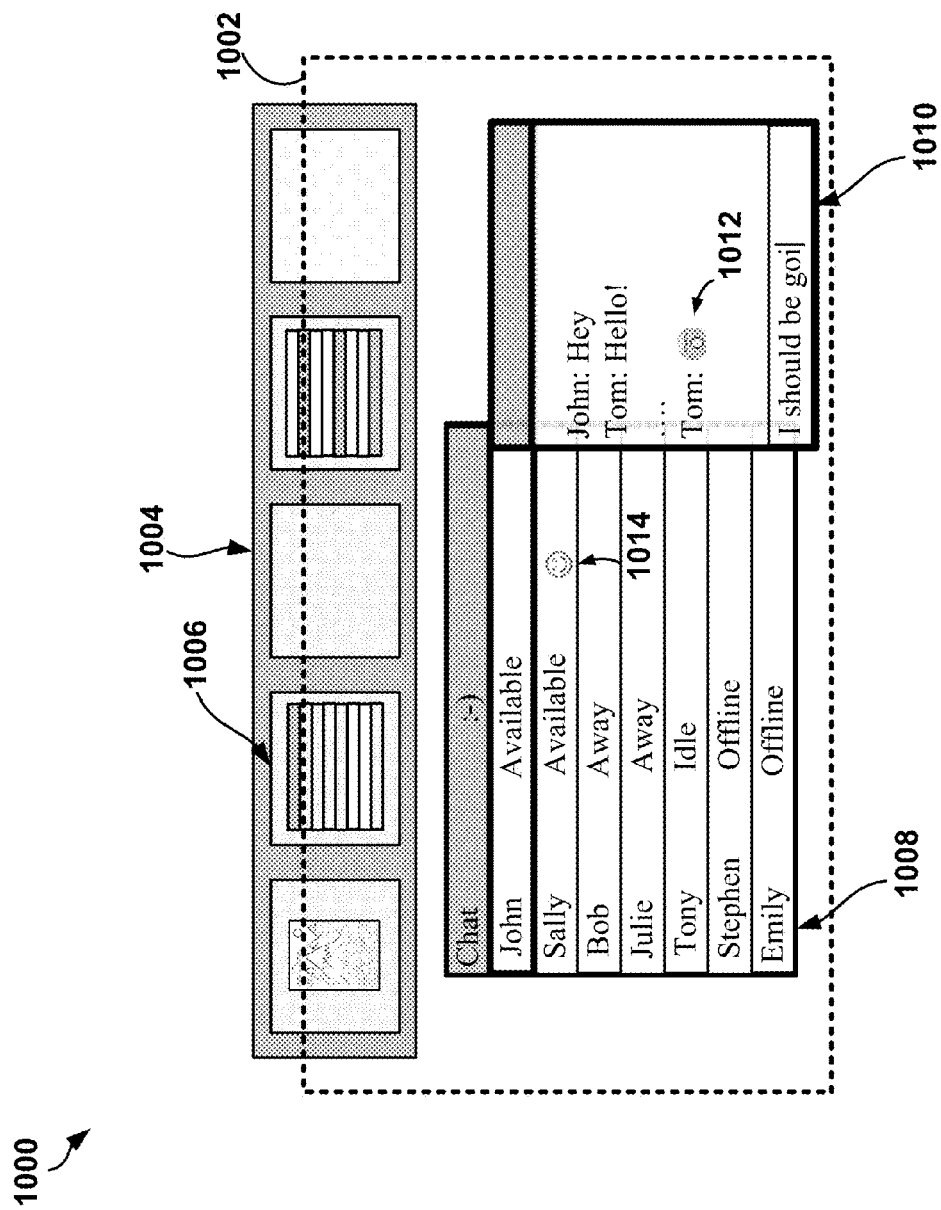
FIG. 10 shows aspects of an example user-interface after annotating a communication session.

FIG. 10 shows aspects of an example user-interface 1000 after annotating a communication session. The example user-interface 1000 may include a view region 1002 as indicated by the dotted frame, and a menu 1004 of content objects 1006. A content object may be selected from the menu 1004. In one example, the content object may be a communication session. For example, the content object may be an application for communicating with another user (e.g., phone call application, video call application, online chat conversation, text/video/voice message, etc.). As shown in FIG. 10, a selected content object 1008 may be displayed within the view region 1002. The selected content object 1008 may be an application for chatting with another user online. The selected content object 1008 may include a list of contact information for other users.

In one example, a user may communicate with another user via an online chat offering instantaneous transmission of messages between the user and the another user. For instance, Tom may be a user of a head-mounted device (HMD) and may be communicating with John. In one instance, information associated with movements or positions of muscles of Tom's face while communicating with John may be used to determine information associated with a facial expression. For instance, Tom may have yawned, and information associated with the yawn may be determined. The information associated with the yawn may be used to send an annotation to John indicating the yawn. For example, an emoticon 1012 or other symbol representing the yawn may be inserted into the chat and automatically sent to John in response to the determined facial expression. In some instances, a textual indication may be added to the chat. In other instances, the indication may be an audio or video annotation.

In another example, a third user, Sally, may also be wearing an HMD. Based on information associated with movements or positions of muscles of Sally's face while Sally is interacting with the communication application, information associated with a facial expression may be determined. For instance, Sally's HMD may determine that Sally smiled. Based on the determination, an annotation 1014 indicating the smile may be added to a status associated with Sally. For example, the annotation 1014 may be a visual indication to other users that Sally is happy or smiling.

In some examples, users may disable the automatic supplementing of communications with a user. In other examples, prior to communicating the communication to another user, the HMD may request confirmation/permission to send/publish the annotation. In one example, a user may be required to opt-in to allowing the facial-muscle information and subsequent facial expressions to be determined. In another example, a user may presented with an option to allow the facial-muscle information, facial expressions, and/or associated annotations to be logged but not shared with other users. For instance, the logging of information may be done while respecting the privacy of a user or masking the identity of the user.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   initiating, on a wearable computing device, an application for communicating with another device, wherein the application comprises an interface;
   receiving a selection of a content object via the interface, wherein the wearable computing device comprises a head-mounted display (HMD);
   displaying the selected content object on the HMD;
   obtaining facial-muscle information while the content object is being displayed on the HMD;
   determining a facial expression based on the facial-muscle information; and
   sending an annotation comprising an indication of the facial expression using the application.

2. The method of claim 1, further comprising:
   receiving a request to search a plurality of content objects based on a given facial expression, wherein the plurality of content objects are associated with a plurality of annotations comprising one or more indications of facial expressions;
   searching the plurality of content objects based on the given facial expression; and
   identifying one or more content objects having annotations that indicate the given facial expression.

3. The method of claim 2, wherein the request is received through a microphone of the HMD.

4. The method of claim 1, further comprising:
   the HMD imaging one or more facial regions using one or more sensors; and
   obtaining the facial-muscle information from the one or more sensors.

5. The method of claim 1, wherein the content object comprises an attachment to a document.

6. The method of claim 1, wherein sending the annotation using the application comprises sending the annotation to the other device during a communication session.

7. The method of claim 6, wherein the annotation comprises a textual indication of the facial expression.

8. The method of claim 6, wherein the annotation comprises a visual indication of the facial expression.

9. The method of claim 1, wherein sending the annotation using the application comprises:
   associating the annotation with status information corresponding to a user of the wearable computing device; and
   sending the status information to the other device.

10. The method of claim 1, wherein the application comprises a video communication application.

11. The method of claim 1, wherein the application comprises a social media application.

12. The method of claim 11, wherein the content object comprises an image or text associated with an account of a user, and wherein sending the annotation using the application comprises sending the annotation to the other device, the other device being associated with the account of the user.

13. A non-transitory computer readable medium having stored therein instructions executable by a computing device to cause the computing device to perform functions comprising:
   initiating, on a wearable computing device, an application for communicating with another device, wherein the application comprises an interface;
   receiving a selection of a content object via the interface, wherein the wearable computing device comprises a head-mounted display (HMD);
   displaying the selected content object on the HMD;
   obtaining facial-muscle information while the content object is being displayed on the HMD;
   determining a facial expression based on the facial-muscle information; and
   sending an annotation comprising an indication of the facial expression using the application.

14. The non-transitory computer readable medium of claim 13, further comprising instructions executable by the computing device to perform functions comprising:
   receiving a request to search a plurality of content objects based on a given facial expression, wherein the plurality of content objects are associated with a plurality of annotations comprising one or more indications of facial expressions;
   searching the plurality of content objects based on the given facial expression; and
   identifying one or more content objects having annotations that indicate the given facial expression.

15. The non-transitory computer readable medium of claim 13, wherein the annotation further comprises a user-indication.

16. The non-transitory computer readable medium of claim 13, wherein the annotation comprises a textual indication of the facial expression.

17. The non-transitory computer readable medium of claim 13, wherein the annotation comprises a visual indication of the facial expression.

18. A wearable computing device, comprising:
   an interface, wherein the interface is configured to control an application for communicating with another device and to receive a selection of a content object;
   a head-mounted display (HMD), wherein the HMD is configured to display the selected content object;
   a sensing component, wherein the sensing component is configured to obtain facial-muscle information while the content object is being displayed by the HMD;
   a processing component, wherein the processing component is configured to determine a facial expression based on the facial-muscle information; and
   an annotation component, wherein the annotation component is configured to send an annotation comprising an indication of the facial expression using the application.

19. The wearable computing device of claim 18, further comprising:
   a retrieval component, wherein the retrieval component is configured to:
   receive a request to search a plurality of content objects based on a given facial expression, wherein the plurality of content objects are associated with a plurality of annotations comprising one or more indications of facial expressions;
   search the plurality of content objects based on the given facial expression; and
   identify one or more content objects having annotations that indicate the given facial expression.

20. The wearable computing device of claim 19, wherein the retrieval component is further configured to:
   receive a request to search a plurality of content objects based on an emotional state implied by one or more given facial expressions;
   search the plurality of content objects based on the emotional state; and
   identify one or more content objects having annotations that indicate the emotional state.

21. The wearable computing device of claim 18, wherein the annotation comprises a textual indication of the facial expression.

22. The wearable computing device of claim 18, wherein the annotation comprises a visual indication of the facial expression.

23. The wearable computing device of claim 18, wherein the wearable computing device has an eyeglasses configuration.

24. The wearable computing device of claim 18, wherein the indication of the facial expression comprises an emotional state implied by the facial expression.

* * * * *